United States Patent [19]
Mirow

[11] Patent Number: 4,872,101
[45] Date of Patent: Oct. 3, 1989

[54] INPUT AND OUTPUT RESPONSIVE CONTROLLED RECTIFIER

[76] Inventor: Fred Mirow, 47 Edgewood Rd., Westwood, Mass. 02090

[21] Appl. No.: 191,010

[22] Filed: May 6, 1988

[51] Int. Cl.$^4$ .............................................. H02M 7/12
[52] U.S. Cl. ........................................ 363/49; 363/79; 363/81
[58] Field of Search ................. 363/45, 49, 67, 74, 363/79, 81, 84, 85, 86, 88, 124, 128; 323/300

[56] References Cited

U.S. PATENT DOCUMENTS 4,207,516  6/1980  Babcock ................................. 363/49

OTHER PUBLICATIONS

"Power Supply Restart Feature", IBM Tech. Discl. Bul., Vol. 29, No. 12, pp. 5310-5314, May, 1987.

Primary Examiner—William H. Beha, Jr.

[57] ABSTRACT

An electronic power supply converts alternating current to a regulated DC voltage with high efficiency. A switch connects the input AC to a DC output capacitor when the input voltage is greater than the output voltage and the output voltage is less than a set point value. The switch receives the input AC and rectifies the input voltage and applies the switch rectified voltage to the output. The voltage difference between the input voltage and the output voltage level at which the switch closes varies in accordance with the input and output voltages.

5 Claims, 5 Drawing Sheets

INPUT AND OUTPUT RESPONSIVE CONTROLLED RECTIFIER

BACKGROUND OF THE INVENTION

In some applications, such as motor control and switching regulators, a source of low DC voltage is needed in which the DC voltage is not required to be isolated from the AC line. In the past the low DC voltage was obtained by dropping a large percentage of the line voltage across a device such as a resistor after the AC input was converted to filtered DC. This approach was very inefficient. Another common approach was to use a transformer to drop the level of the AC voltage before converting to filtered DC. This approach was expensive because of the cost of the transformer.

Additionally, previous inventions have used transistors that conducted nearly continuously even with large voltage drops across them. Another approach used an SCR which was controlled by an integrating circuit. The charging time of the integrator was controlled by the DC output voltage. While this approach was efficient, it had other problems. During power turn on when the output voltage was low, the SCR fired before the AC input could reach peak value. This lead to a high current surge and high DC output voltage unless additional protection was provided.

A solution to this invention was taught in U.S. Pat. No. 4,709,322 issued to Mirow on Nov. 27, 1987. Mirow taught a supply wherein power was switched in accordance with a comparison between the input and output voltages. When the input was substantially equal to the output, the switch was closed thereby preventing a current surge. However, in the supply of Mirow variations in the input supply voltage could limit the available DC output current. Another problem with the converter of Mirow was that the voltage across the switch at which it may close was not adjusted to compensate for variations in DC output current. This causes loose DC output voltage regulation. In addition the voltage transients caused by the application of the AC input voltage could cause the switch to close at the wrong time.

SUMMARY OF THE INVENTION

An electronic power supply that converts alternating current to a regulated DC voltage with high efficiency. A switch connects the input AC to a DC output capacitor when the input voltage is greater than the output voltage and the output voltage is less than a set point value. The switch receives the input AC and rectifies the input signal and applied the switch rectified signal to the output. The voltage difference between the input voltage and the output voltage level at which the switch closes varies in accordance with the input and output voltages.

DETAILED DESCRIPTION OF THE INVENTION

Figure 1:
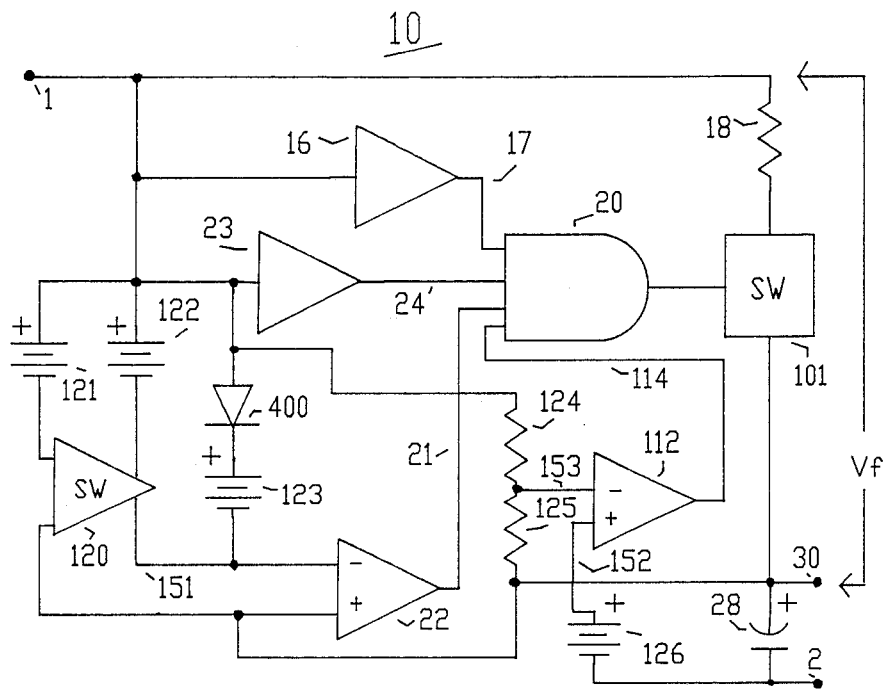
FIG. 1 is a block diagrammatic representation of an AC to DC converter according to the invention.

Referring now to FIG. 1, there is shown AC to DC converter 10 of the present invention. Converter 10 receives a conventional AC input voltage, for example 60 Hertz 120 volt AC line voltage between input 1 and circuit common 2. The AC is supplied from input 1 without any filtering to load capacitor 28 through resistor 18 and switch 101 when switch 101 is on. Resistor 18 limits the maximum current flow through switch 101. Resistor 18 may be the internal resistance of switch 101. The resistance of resistor 18 may be approximately 1 ohm since the maximum voltage across resistor 18 may be approximately 20 V.

The opening and closing of switch 101 is controlled by the output of AND gate 20. Switch 101 turns off when the output of AND gate 20 is low or the voltage at input 1 is less than the voltage at output 30. Converter 10 provides a DC output voltage across capacitor 28 at output 30 and circuit common 2. The output of AND gate 20 depends on the state of gate 20 input lines 17, 24, 21, and 114. When all the input lines are high, the output of AND gate 20 goes high turning switch 101 on.

Figure 4A:
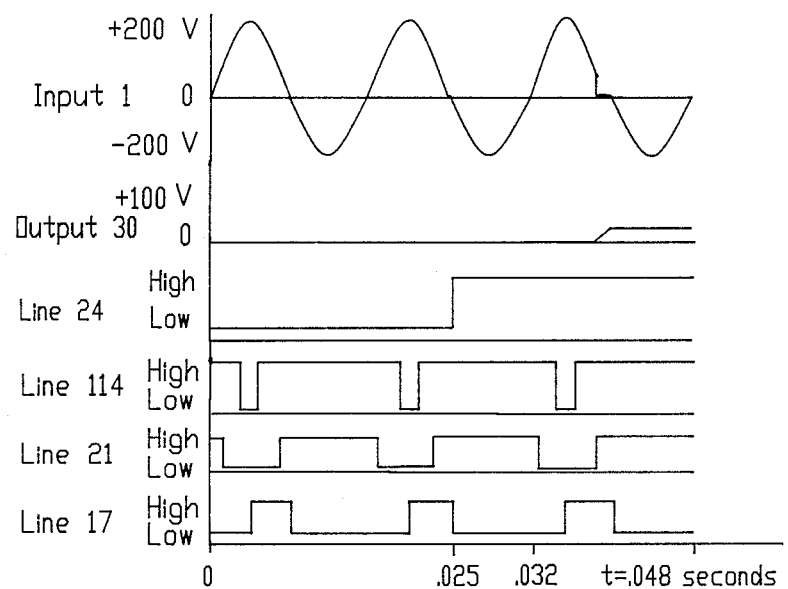
FIG. 4A and 4B shows various waveforms at various modes of FIG. 1.
Figure 4B:
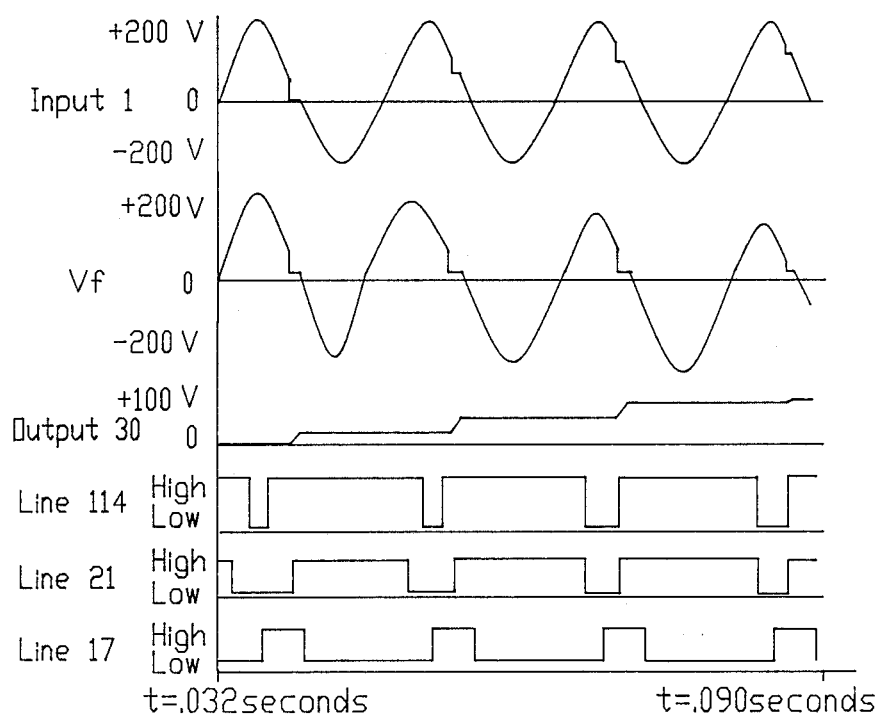

The level on line 21 is controlled by comparator 22. Comparator 22 causes line 21 (shown in FIG. 4b) to go high when the voltage on line 151 is less then the voltage of output 30. The voltage on line 151 is equal to that of (1) input 1 minus the voltage drop of voltage reference 123 when switch 120 is open and (2) input 1 minus reference voltage 122 when switch 120 is closed. Reference voltage 122 may be approximately 20 volts and is always less then the voltage of reference voltage 123 which maybe 50 volts. When voltage references 122, 123 are connected in parallel by closing switch 120 the voltage between input 1 and line 151 is limited to that of the lowest reference voltage, reference voltage 122. Diode 400 prevents current from voltage reference 123 flowing through voltage reference 122 when switch 120 is closed. The transition of comparator 22 to a high output occurs only when the voltage difference between input 1 and output 30 (Vf) is lower then the reference voltages 123, or 122 if switch 120 is closed. This limits power dissipation in resistor 18 and switch 101 since the maximum voltage Vf (shown in FIG. 4b) at which current can flow through switch 101 is limited to a low value. The state of switch 101 is thus controlled by voltage Vf.

When the peak voltage at input 1 minus the voltage of reference voltage 121 is less than that of output 30, switch 120 closes connecting reference voltage 122 between input 1 and line 151. This enables the input voltage at input 1 to control the maximum voltage across switch 101 at which switch 101 closes. By lowering the maximum voltage difference between input 1 and output 30 at which switch 101 closes, the maximum peak input source current is prevented from becoming too large. This is because for a fixed voltage Vf at which switch 101 closes, the peak AC input source current increaes as the voltage level at output 30 approaches the peak voltage at input 1. The voltage of reference voltage 121 may be 100 volts.

Comparator 112 regulates the voltage at output 30 by comparing the voltage at output 30 (shown in FIG. 4b) to the voltage of reference voltage 126. As the voltage at output 30 approaches the voltage of reference voltage 126 the input 1 voltage which causes switch 101 to close is reduced. Reference voltage 126 is used to set the desired voltage level at output 30 by setting the voltage level of line 152. The output level of comparator 112 on line 114 (shown in FIG. 4b) goes high when the voltage on line 153 is less than that of line 152. Resistors 124 and 125 form a voltage divider having as its inputs the voltages at input 1 and output 30. The voltage at line 153 is thus equal to the voltage at output 30 plus a fraction of the voltage difference between input 1 and output 30. As the voltage at 30 approaches that of reference voltage 126, the voltage at input 1 which causes the output of comparator 112 to go high is reduced. For example, for line 114 to go high when the voltage level of output 30 equals that of line 152 the voltage level at input 1 must decrease to a lower voltage level than that at output 30. This decreases the voltage Vf at which switch 101 may close since voltage at output 30 has increased and that at input 1 has decreased. Vf and the fixed circuit impedance represented by resistor 18 control the amount of charge transferred to capacitor 28. As Vf decreases the amount of charge transferred is decreased. When Vf is equal to zero, voltage at input 1 and output 30 are equal, no charge is transferred and the voltage at output 30 cannot increase. The voltage at output 30 thus begins to decrease at a rate depending on the current flow out of output 30. As the voltage at output 30 decreases, Vf increase until a stable condition is reached wherein the charge transferred through switch 101 equals the charge transferred out of output 30. By using the voltage at output 30 to control Vf, a negative feedback loop is thus formed. This negative feedback loop maintains a constant voltage at output 30 against variation in current flow out of output 30.

The level of line 17 is controlled by decreasing magnitude detector 16 which detects a reducing slope of the input voltage applied to input 1. The output of decreasing magnitude detector 16, the reducing slope signal of line 17 (shown in FIG. 4b), is high only after the maximum value of the AC voltage at input 1 has occurred. There is a zero level on line 17 at all other times. This zero level on line 17 prevents AND gate 20 from triggering switch 101 during the rising portion of the AC voltage at input 1. This is required to prevent the DC output voltage at output 30 from increasing to nearly the peak voltage of the AC voltage at input 1 when AND gate 20 cannot turn off switch 101. Switch 101 will only turn off when the AC voltage drops to nearly the same voltage level as output 30.

Line 24 (shown in FIG. 4b) is controlled by time delay 23. The output of time delay 23 only goes high and then stays high after the AC voltage at input 1 has been present for greater then a fixed time period. This fixed period of time may be approximately 0.025 seconds. By preventing switch 101 from operating for a fixed time period after application of the AC input voltage to input 1, time is allowed for voltage transients to decay without closing switch 101.

Thus switch 101 is turned on only if (1) Vf is less than reference voltage 123 as determined by comparator 22, (2) the voltage on line 153 is less than the voltage on line 152 as determined by comparator 112, (3) the AC voltage at input 1 is present for a greater period of time than that determined by time delay 23 and (4) if switch 101 can not be turned off by And gate 20, the AC voltage at input 1 has a reducing slope as determined by detector 16.

Figure 2:
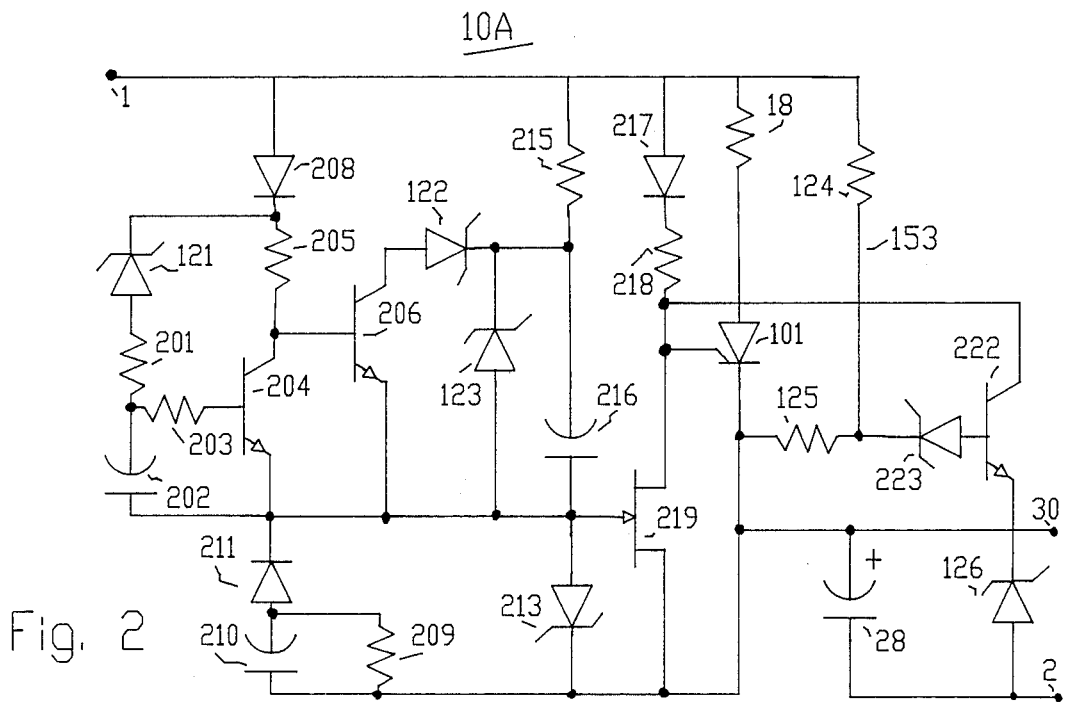
FIG. 2 is a detailed embodiment of FIG. 1.

Referring now to FIG. 2, a detailed embodiment of AC to DC converter 10 is shown. Converter 10a uses SCR 101 as a switch. The zeners 121, 122, 123, 126, and 223 are biased to act as reference voltages. The AC voltage is applied between input 1 and circuit common 2. When Vf is negative SCR 101 is reverse biased and can not conduct until Vf is positive. During the time when the voltage Vf is positive the following occurs. When transistor 204 is off transistor 206 is turned on, this connects zener 122 in parallel with zener 123. When transistor 204 is on, transistor 206 is off disconnecting zener 122 from the circuit. VZ is the maximum voltage across capacitor 216 and is equal to the breakdown voltage of zener 123, or 122 when transistor 206 is on. The breakdown voltage of zener 122 is less then that of zener 123.

Rectifier 208 permits only positive voltage at input 1 to be applied to resistor 205 and zener 121. Resistor 205 limits the current into the base of transistor 206 or the collector of transistor 204 when it is on. Zener 121 conducts current when its breakdown voltage is exceeded charging capacitor 202 through current limiting resistor 201. When capacitor 202 charges to above 0.8 volts transistor 204 turns on turning transistor 206 off. Resistor 203 limits the discharge rate of capacitor 202 into the base of transistor 204 to maintain current flow for a complete cycle of the AC input voltage. Thus when the peak voltage of Vf is less than the breakdown voltage of zener 121, zener 122 is placed in parallel with zener 123.

JFT 219 turns off only when a negative voltage is applied between its gate and source. The source is connected to output 30. Zener 213 prevents FET 219 gate reverse voltage ratings from being exceeded. As the voltage Vf increases from zero to its peak value, current flows through current limiting resistor 215 and capacitor 216 keeping JFET 219 on. When the voltage across capacitor 216 reaches VZ the current then flows through either zener 123 or zener 122, depending on the state of transistor 206, and JFET 219 remains on. After the peak AC voltage at input 1 has passed, the voltage level of Vf decreases till it is below that of VZ. At this point capacitor 216 begins to discharge providing reverse bias at the gate of JFET 219 turning it off only if capacitor 210 is charged.

For the first few cycles of AC voltage at input 1, capacitor 210 prevents JFET 219 from turning off. The converter turn on delay occurs because capacitor 210 has to be charged to a high enough voltage to allow JFET 219 to be reverse biased and turn off. Resistor 215 limits the charging current rate when the voltage at input 1 is less than at output 30. Diode 211 prevents capacitor 210 from being discharged each cycle. Resistor 209 slowly discharges capacitor 210 to reset the turn on delay function after voltage has been removed from input 1.

Transistor 222 turns on when the voltage on line 153 is higher than the breakdown voltage of zeners 126 and 223. The voltage on line 153 is from the output of a voltage divider formed by resistor 124 and 125. The other ends of the resistors are connected to input 1 and output 30. As the voltage at output 30 approaches the breakdown voltage of zeners 126 and 223 the voltage at input 1 required to turn transistor 222 off is reduced. This action regulates the voltage level at output 30.

SCR 101 is turned on by applying a positive voltage between its gate and cathode. When JFET 219 and transistor 222 both are off the current flowing through diode 217 and resistor 218 into the SCR 101 gate, and turns it on. Diode 217 protects transistor 222, JFET 219, and SCR 101 from being damaged by reverse voltage breakdown. When SCR 101 is on the voltage at input 1 is applied to output 30 through current limiting resistor 18 until the voltage at input 1 falls below that at output 30. When JFET 219 is on SCR 101 cannot turn on since its gate-cathode voltage is zero. When the voltage at output 30 is higher then the breakdown voltage of zener 126 and transistor 222 is on, SCR 101 can not turn on since the current from resistor 218 flow into the collector of transistor 222 instead of the gate of SCR 101.

Figure 3:
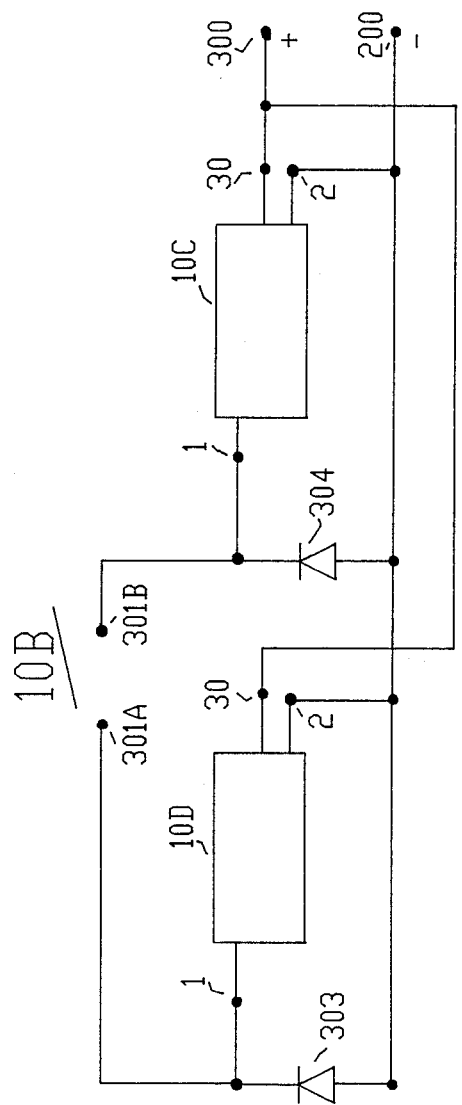
FIG. 3 is another block diagrammatic representation of an AC to DC converter of FIG. 1.

Referring now to FIG.3, there is shown another alternate embodiment of converter 10. Converter 10B consist of two converter units 10 which are further identified by the legends D, and C. Converters 10C and 10D are connected along with rectifiers 303 and 304 in a configuration similar to a full wave bridge. This permits both half cycles of the AC input voltage sine wave to be used. The AC source voltage is aplied between inputs 301A and 301B. The output voltage is between output 300 and circuit common 200. During the half cycle when input 301A is positive with respect to input 301B, rectifier 304 connects input 301B to circuit common 200 and converter 10D connects input 301A to output 300 at the appropriate time. Converter 10C and rectifier 303 remain off during the entire half cycle. During the next half cycle when input 301B is positive with respect to input 301A, rectifier 303 connects input 301A to circuit common 200 and converter 10C connects input 301B to output 300 at the appropriate time. Converter 10D and recitifer 304 remain off during the entire half cycle.

I claim:

1. A high efficiency converter for obtaining a lower magnitude DC voltage from an AC voltage without magnetics comprising:

switch means for receiving an input AC voltage and rectifying and applying the switch recitifed voltage to an output when the switch means is closed;

means for comparing the voltage level of the input AC voltage with a voltage level determined by the output voltage and a reference voltage;

means for closing the switch in response to said determination; and means for varying the predetermined voltage level between the input AC voltage and the voltage level at the output terminal at which the switch is closed in accordance with the output voltage.

2. The converter of claim 1 including means for preventing closing of the switch means until the input AC voltage is received for a predetermined period of time.

3. The converter of claim 1 including means for preventing closing of the switch means until the input AC voltage has a reducing slope.

4. The converter of claim 1 including means for determining whether the voltage across the switch means is less than a predetermined amount and means for closing the switch means in response to the determination.

5. A high efficiency converter for obtaining a lower magnitude DC voltage from an AC voltage without magnetics comprising:

switch means for receiving an input AC voltage and rectifying and applying the switch rectified voltage to an output when the switch means is closed;

means for comparing the voltage level of the output with the input AC voltage;

means for closing the switch only in response to said determination;

means for comparing the voltage level of the maximum voltage difference between the input AC voltage and output; and means for varying the predetermined voltage level between the input AC voltage and the voltage level at the output terminal at which the switch is closed in accordance with the input voltage.

* * * * *